United States Patent [19]

Wyndham et al.

[11] Patent Number: 4,695,436
[45] Date of Patent: * Sep. 22, 1987

[54] PROCESS FOR MANUFACTURING HIGH PURITY METAL CHLORIDES

[75] Inventors: Ronald Wyndham, Thibodaux, La.; Gervaise M. Chaplin, New Delhi, India; William M. Swanson, Tuscon, Ariz.

[73] Assignee: Toth Aluminum Corporation, Metairie, La.

[*] Notice: The portion of the term of this patent subsequent to Apr. 30, 2002 has been disclaimed.

[21] Appl. No.: 691,958

[22] Filed: Jan. 16, 1985

[51] Int. Cl.[4] .................. C01B 9/02; C01F 7/60; C01F 7/62
[52] U.S. Cl. ................... 423/135; 423/136; 423/496
[58] Field of Search ............ 423/111, 135, 136, 137, 423/496

[56] References Cited

U.S. PATENT DOCUMENTS

| 4,082,833 | 4/1978 | Wyndham et al. | 423/135 |
| 4,342,729 | 8/1982 | Clavel et al. | 423/111 |
| 4,514,373 | 4/1985 | Wyndham | 423/496 |

FOREIGN PATENT DOCUMENTS 215769 11/1984 German Democratic Rep. .................. 423/496

Primary Examiner—John Doll
Assistant Examiner—Jeffrey Edwin Russel
Attorney, Agent, or Firm—George A. Bode

[57] ABSTRACT

A mixture of an aluminous ore and a carbon source is dried and calcined in the presence of a sulfur-containing compound. The mixture is then chlorinated to produce crude metal chlorides. Aluminum chloride is condensed and separated from the remaining metal chlorides, combined with sulfur and aluminum powder, and sublimated and desublimated so as to produce substantially pure aluminum chloride.

9 Claims, 2 Drawing Figures

PROCESS FOR MANUFACTURING HIGH PURITY METAL CHLORIDES

BACKGROUND OF THE INVENTION

1. Field of the Invention

The present invention relates to a process for the manufacture of pure metal chlorides, and more particularly relates to a process for manufacturing pure aluminum chloride ($AlCl_3$), silicon tetrachloride ($SiCl_4$), and titanium tetrachloride ($TiCl_4$).

2. General Background

The production of pure metal chlorides, particularly aluminum chloride, is of particular significance in the manufacture of aluminum metal. Two methods are presently used to manufacture aluminum. The first is the 100 year old Hall process and the second is the relatively new Alcoa process.

The Hall process requires a feed of pure alumina which heretofore has been produced commercially solely by the Bayer process which requires a supply of high grade bauxite.

The Alcoa process is used to produce aluminum metal by electrolyzing aluminum chloride produced by carbochlorinating Bayer alumina.

It can be seen that both of the above processes require a supply of high grade bauxite in order to obtain the necessary intermediates of alumina and/or aluminum chloride. This creates a problem as the supply of high grade bauxites is limited and occurs only in a limited number of countries. This problem creates a need for a method of producing pure aluminum chloride chloride with the use of an ore other than bauxite. Patents aimed at the production of aluminum chloride of which applicant is aware include the following:

U.S. Pat. No. 3,935,297, entitled "Carbo-Chlorination Of Aluminum Phosphate" ($AlPO_4$) discloses the process wherein aluminum phosphate ore is chlorinated to yield aluminum chloride, phosphorous chlorides and phosphorous oxy chloride.

U.S. Pat. Nos. 3,937,786 and 3,950,485 disclose processes for the production of aluminum chloride from raw materials such as coal, slate or bituminous shale. The raw material is chlorinated and is required to have an ash content of at least 30% by weight with an aluminum content of the ash being at least 20% calculated as $Al_2O_3$.

U.S. Pat. No. 3,956,454 discloses a process for using low grade carbonaceous material to form aluminum tri-chloride. A low grade aluminous material is ground with a suitable reductant and mixed together and formed into tablets or brickets for chlorinating a compresses or paste-like form.

U.S. Pat. No. 4,083,923, discloses a process for the production of aluminum chloride by the carbo chlorination of such ores as clay, bauxites and laterytes wherein the aluminum chloride produced is purified by passing the aluminum chloride through a suitable metalic solvent after the aluminum chloride has been separated from the $FeCl_3$ also produced. The $AlCl_3$ and the $FeCl_3$ are contained in a molten salt solvent from which they are recovered and then separated.

U.S. Pat. No. 4,083,927, of which applicant is the inventor, discloses a process for the carbo-chlorination of koalinitic ores wherein catalytic amounts of boron chloride are added to the carbo-chlorination step.

U.S. Pat. No. 4,220,629, of which applicant is a co-inventor, discloses a process for the manufacture of metal chlorides by the double decomposition reaction between a metal chlorinating agent and a metal oxide in the presence of small amounts of boron chloride.

Although the above patents disclose methods for the production of aluminum chloride, the ores from which production is possible is limited. The present invention solves this problem by providing a process which may be utilized with a wide variety of aluminous ores. The present invention also results in the production of pure $TiCl_4$ which is valuable as titanium is a rare and valuable metal used in various industries.

SUMMARY OF THE PRESENT INVENTION

What is provided is a process in which aluminous ore, a carbon source, and other raw materials are used to make and purify $AlCl_3$, $SiCl_4$, and $TiCl_4$. Ores usable in this invention are those containing aluminum oxides and silicates that may be carbo-chlorinated using the instant catalyst at a temperature range of approximately 500° C. to 1000° C. Examples of such ores include kaolinitic, illitic, and other aluminum clays; bauxite clay and other bauxite ores; siliceous bauxites and sillimanites; kyanites; aluminus shales, slates and fuel ashes; nepheline syenites; and anorthosite. The carbon source whih is used in the drying process may be a carbonaceous gas such as carbon monoxide or carbonyl chloride or phosgene ($COCl_2$) or it may be one of a number of coal cokes or chars, including lignite, petroleum coke and peat. The process is generally comprised of the following steps:

Step 1—Drying

The aluminus ore and a carbon source are fed into a dryer where they are dried with off gases from a calciner at a temperature range between approximately 100° C. and 200° C. The dryer removes the free water from the aluminous ore and the carbon source.

Step 2—Calcination

The calcination step utilizes elevated temperatures to remove the chemically bound water from the ore at a temperature of 500°–900° C. The ore must be dried and removed of free water and chemically bound water to prevent objectionable hydrolysis of metal chlorides or the formation of corrosive hydrochloric acid.

Step 3—Chlorination

During the chlorination step, a chlorinating agent such as dry chlorine gas and/or a functionally equivalent chlorine compound is combined with the ore, catalyst, and reductant.

Step 4—Condensation

The solids condensation system receives the hot vapors from the chlorinator and recovers heat and condenses $AlCl_3$. A heat exchanger and $AlCl_3$ condensor are used in the solids condensation system.

Step 5—Liquids Condensation

The uncondensed vapors from the solids condensation unit flow into the liquids condensation system for condensation of approximately 98% of the $SiCl_4$ and 98% of the $TiCl_4$.

Step 6—$SiCl_4$ and $TiCl_4$ Purification

The liquid mixture entering the $SiCl_4$ purification system is directed to conventional rectification and condensation equipment for separation of the $SiCl_4$ and $TiCl_4$ and further purification of $SiCl_4$ and $TiCl_4$.

Step 7—$AlCl_3$ Purification (Blender)

During the blending operation, the crude solid $AlCl_3$, sulfur containing compound and powdered aluminum metal are fed into a blender.

Step 8—Multi-State Sublimation

A first screw type sublimer commonly used in sublimation processes receives the mixture from the blender and operating at a temperature of at least 180° C. and a pressure of at least one atmosphere, the solid $AlCl_3$ sublimes to $AlCl_3$ vapor at these conditions. These steps of sublimation and desublimation are repeated until high purity $AlCl_3$ is achieved.

Step 9—Granulated Aluminum Metal Reactor

The pure $AlCl_3$ from the sublimer may be directed through a granulated reactor which is comprised of solid aluminum granules or activated granular metal which removes the sulfur impurities and non-aluminum metal chloride traces.

Step 10—Aluminum Chloride Condensor

The purified $AlCl_3$ vapor/nitrogen mixture is then directed into the condenser where the $AlCl_3$ solidifies at a temperature below 180° C.

Step 11—Optional Rectification

If a purer $AlCl_3$ product is desired, the $AlCl_3$ vapor leaving the granulated reactor may be routed to a rectification column for additional purification before being directed to the $AlCl_3$ condenser.

Step 12—Polution Control

The polution control system scrubs the gases from the system with an alkali solution before they are released to the atmosphere, where they then contain mostly $CO_2$.

DETAILED DESCRIPTION OF THE INVENTION

Figure 1:
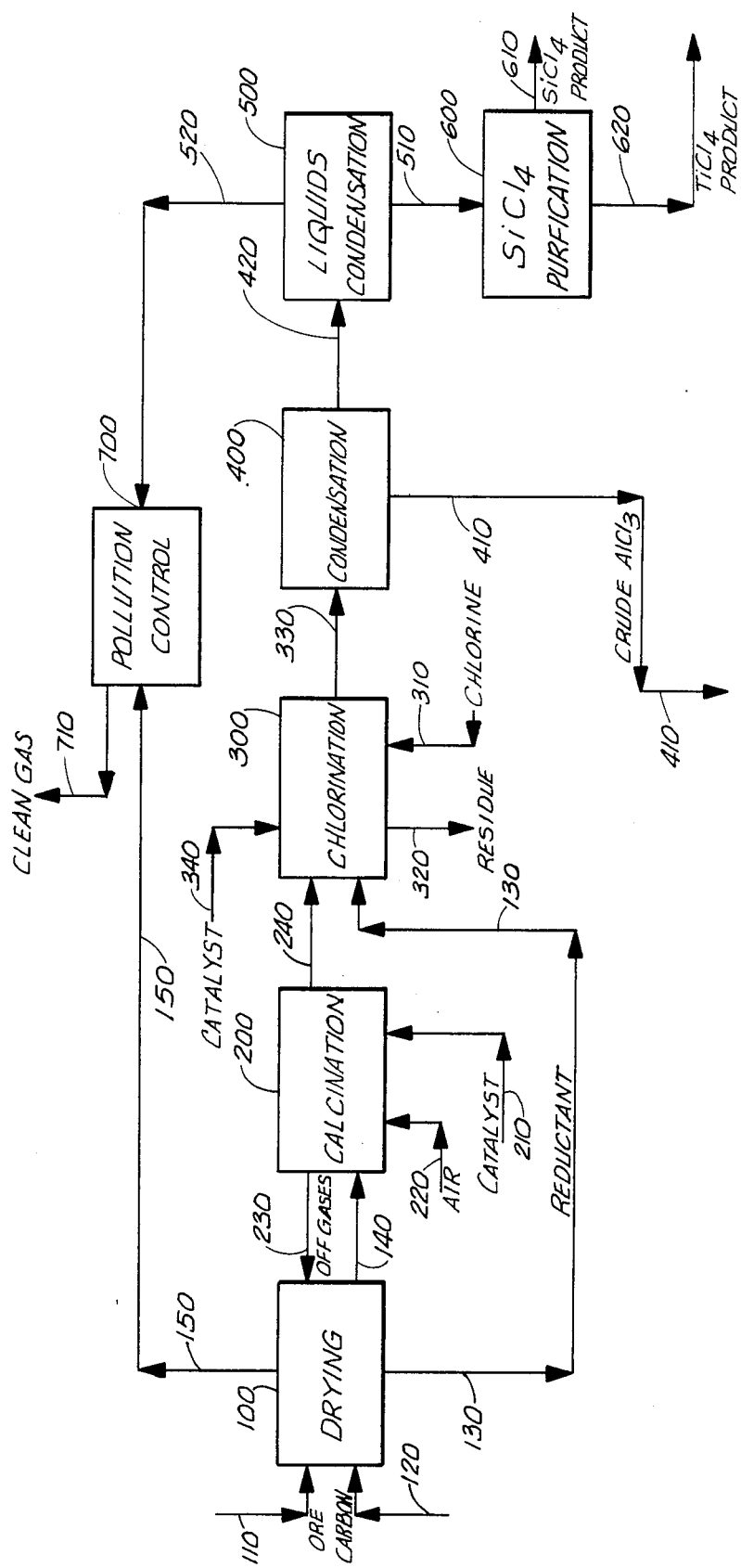
FIG. 1 is a block diagram illustrating the production and purification of $AlCl_3$, $SiCl_4$, and $TiCl_4$.
Figure 2:
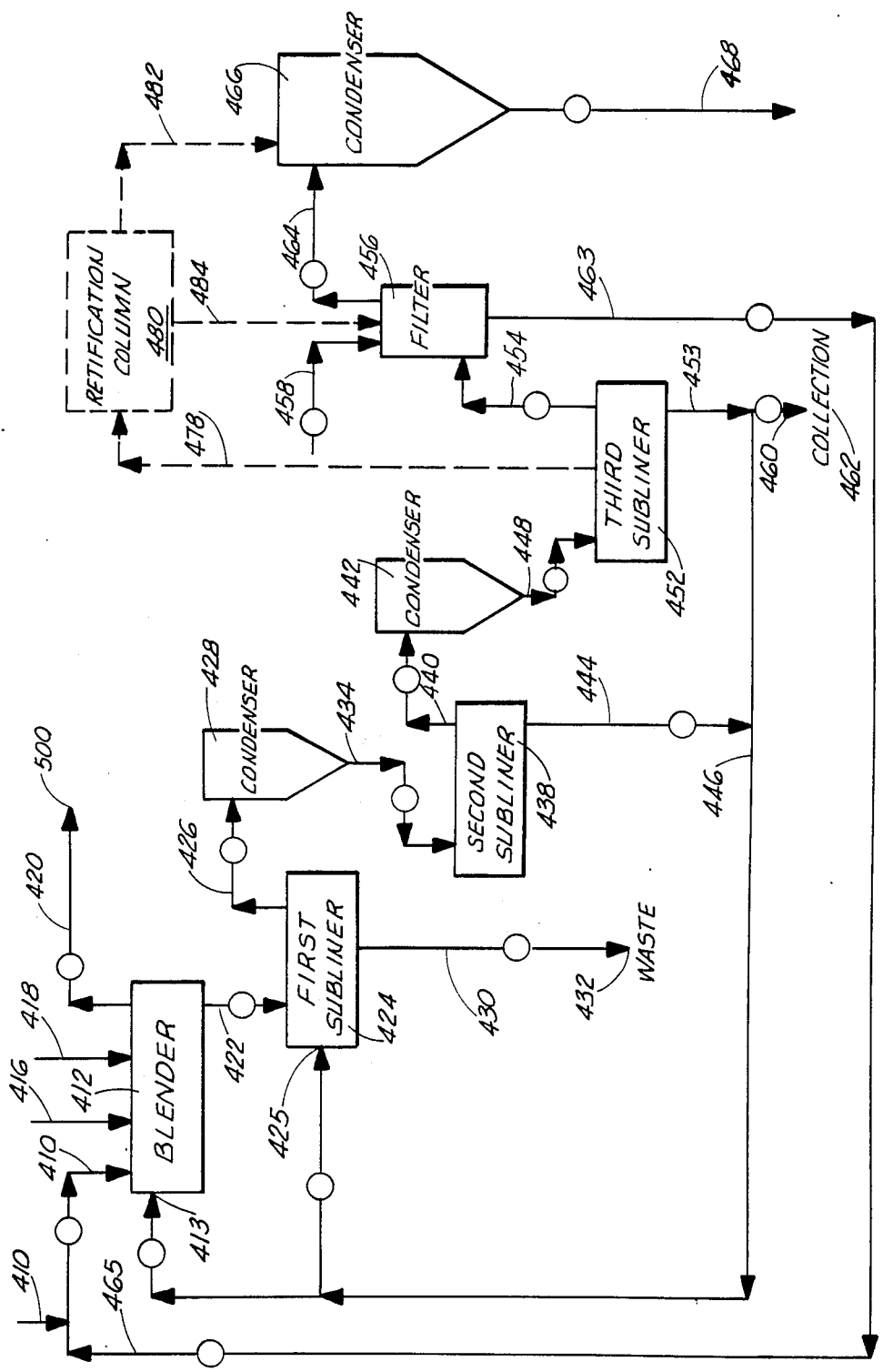
FIG. 2 is a continuation of the block diagram of FIG. 1 in which the crude aluminum chloride ($AlCl_3$) produced in FIG. 1 is purified.

Referring now the drawings, it is seen that the block diagram of FIGS. 1 & 2 illustrates the process for the production and purification of $AlCl_3$, $SiCl_4$, and $TiCl_4$. For purposes of understanding, each step will be generally explained with a more detailed explanation to follow.

Drying step 100 comprises the feeding of the aluminous ore 110 and a carbon source 120 into a dryer where the free water in the ore and carbon source is removed by heating with off gases from calcination step 200. The dried ore and carbon source are then directed to the calciner by stream 140 for the removal of chemically bound water. This step is accomplished by addition of a sulfur containing catalyst and heat in the calcination step. The heat for calcination is provided by the burning of the dried carbon source in situ with air. As seen in FIG. 1, the off gases from calcination step 200 are directed along stream 230 back to drying step 100 to provide heat for drying step 100. The addition of the sulfur containing catalyst is an aid in promotion of the reactivity of the ore in the subsequent chlorination step 300.

In chlorination step 300, additional sulfur containing catalyst, a chlorinating agent, the dried carbon source and the calcined ore are fed into the chlorinator. The carbon source serves as the reductant in the carbochlorination reaction and the sulfur containing catalyst serves to increase both reaction rates and yields. The vapors, which consist of hot metal chloride vapors, are directed from the chlorinator through stream 330 to solids condensation step 400.

During the solids condensation step 400, the hot metal chloride vapors obtained from chorination step 300 are first passed through a heat exchanger for the recovery of heat from the vapors. These vapors are then directed into a solids condenser not shown where the aluminum chloride solidifies. Any $FeCl_3$ which is present with the $AlCl_3$ will also solidify along with the $AlCl_3$. The solids are then conveyed as crude $AlCl_3$ to the $AlCl_3$ purification system, best seen in FIG. 2, through stream 410 with the remaining vapors being transported to liquids condensation step 500.

FIG. 2 represents the $AlCl_3$ purification process, the crude $AlCl_3$ obtained from solids condensation step 400 is directed through stream 410 into blender 412 where the crude $AlCl_3$ is mixed with a sulfur containing compound, a catalyst, and powdered aluminum metal. This blended mixture is then directed to a first sublimer 424 through stream 422. In sublimer 424, the solid $AlCl_3$ is sublimed to $AlCl_3$ vapor. This vapor is then directed to several other sublimers for further purification. The purified $AlCl_3$ vapor is then transported through stream 464 to $AlCl_3$ condensation unit 466 where the $AlCl_3$ is solidified and collected as product at point 468.

Any waste gases produced from the dryer 100 and liquids condensation unit 500 are directed along stream 150 and 520 to pollution control system 700 where these gases are scrubbed and then vented to the atmosphere via line 710 as clean gases.

Each step will now be described in greater detail.

Step 1—Drying

Drying step 100 comprises combining the raw materials of aluminous ore and a carbon source in a dryer. The ores which have been found to be usable in the process are those containing aluminum oxides and silicates and which are capable of being carbochlorinated using the present catalyst at a temperature of approximately 500° C. to 1000° C. The preferred temperature range of 700° C. to 900° C. has been found to produce the most desirable results. Examples of ores with these capabilities include kaolintic, illitic, and other aluminum clays; bauxite clay and other bauxite ores; siliceous bauxites and sillimanites; kyanites; aluminous shales, slates and fuel ashes, nepheline sillimanites; and anorthosite. Although the preferred carbon source is either lignite char or petroleum coke, a carbon source to be utilized may also be a carbonaceous gas such as CO or $COCl_2$ or any one of a number of coal cokes or chars including lignite, petroleum coke or peat.

In drying operation 100, the aluminous ore and carbon source are directed into the dryer, which is equipment well known and normally used for these types of operations, through streams 110 and 120 respectively where the ore and carbon source are dried by removal of the free water therein. The heat for drying of the ore and carbon source is provided by off gases by the calciner step 200 which are recycled through stream 230. The temperature range for the drying is normally between 100° C. and 200° C. However, in the preferred embodiment, the temperature for drying is preferably approximately 150° C. After drying, the dried ore and carbon source are then ground such that a particle size distribution is produce which is usually between 45 microns and 3000 microns. The preferred particle size is between 70 microns and 2200 microns. Any off gases and evaporated moisture produced in drying operation 100 are directed through stream 150 to polution control system 700 which will be described further at a later point. It should be noted that stream 150 must be kept at a temperature of at least 100° C. to ensure complete drying of the ore and carbon source. The dried ore and a portion of the dried carbon source are then directed through stream 140 to calcination step 200. Any remaining dry carbon source is directed via stream 130 to chlorination step 300 where it is used as the reductant in the carbochlorination reaction.

Step 2—Calcination

During the calcining operation, the dried ore and carbon source are fed through stream 140 into calciner 200 with dried air which is fed in through stream 220 and a sulfur containing compound which is fed in via stream 210. The sulfur containing compound acts as a catalyst. The equipment for the calciner may be a rotary kiln, a fluid bed reactor or other conventional calcination equipment in which the products of combustion make direct contact with the ore. The operation is carried out at elevated temperatures for the removal of water which is chemically bound in the ore and the conversion of kaolin to meta-kaolin. The heat for the calcination is provided by burning the dried carbon source in situ with air to provide a temperature of approximately 500° C. to 900° C. The preferred temperature range is approximately 700° C. to 850° C. Any off gases which are generated in the calciner are directed to dryer 100 through stream 230 to provide heat for the drying operation.

The calcining equipment must provide a substantial gas flow around the ore particles for quickly removing water vapor. Otherwise, the kaolinitic clay will dehydrate to a phase which is difficult to chlorinate. As kaolinitic clay exists in nature as stacks of small thin platelets, sudden exposure of kaolinitic clay to high temperature causes the steam from decomposition to force the platelets apart. This affords access for reaction gases to extensive exposed surfaces and greatly expedites the reaction. A sufficient gas flow around the ore particles ensures that the kaolin is converted into highly reactive meta-kaolin. The substantial gas flow also rapidly removes volatiles from the carbon source and also results in a higher reactivity from the carbon source and higher metal chloride yields than if the carbon source is coked by a conventional method.

The addition of a sulfur containing compound as a catalyst during calcination increases both reaction rate and yields. The following examples illustrate the dramatic difference in kaolin clay reactivity when calcined with or without gas flow over the kaolinitic clay particles and with or without a sulfur containing compound as a catalyst.

EXAMPLES 1 AND 2

In Example 1, 1 gram of dried but uncalcined kaolinitic clay was placed in a boat which was then inserted into a horozontal tube furnace at 700° C. for 45 minutes under a static air atmosphere. After calcination the boat was removed, allowed to cool, and the 40% by weight of activated carbon was mixed with the clay.

The mixture in the boat was re-inserted into the tube furnace at 900° C. and excess chlorine gas was passed through the furnace and over the reaction mixture for 30 minutes. The reaction mixture was removed and cooled. An analysis of the reaction mixture showed that 20.9% of the $Al_2O_3$ and 22.6% of the $SiO_2$ had been converted to their respective chlorides.

Example 2 was identical to Example 1 with the exception that a flow of nitrogen gas was allowed to pass over and diffuse through the kaolinitic clay during calcination. In this case, analysis showed that 61.1% of the $Al_2O_3$ and 60.8% of the $SiO_2$ had been converted to their respective chlorides. Further experiments using argon, carbon monoxide, carbon dioxide, air and mixtures of these as purge gases during calcination gave similar improved results. Example 2 illustrates the greatly improved yields which may be obtained by providing a high velocity of gas through and around the particles during the calcination. As mentioned earlier, the particles of ore and carbon source should be ground to increase surface area but not be so fine as to lose mixture as dust during the operation.

EXAMPLES 3 AND 4

Koalinitic clay was dried by heating to a temperature of 140° C. and then ground to 200 mesh. The ground clay was then mixed with powdered carbon and, in example 4, also mixed with 5% elemental sulfur by weight. The mixture was bound together with a 2% starch binder and then again crushed to 200 mesh. The reactant mass was then calcined by heating to a temperature of 700° C. for 35 minutes under a flow of argon. After calcination, the temperature was increased to 800° C. and the flow of argon was replaced with a flow of chlorine. Sulfur, as a catalyst, in the form of $H_2S$ was introduced along with the chlorine, chlorination was continued for 25 minutes, and then the reaction mixture was cooled and analyzed.

| EX-AM-PLE | ADDED DURING | | | % WEIGHT CONVERSION | | | |
|---|---|---|---|---|---|---|---|
| | CAL-CINA-TION | CHLORI-NATION | TYPE | $Al_2O_3$ | $SiO_2$ | $Fe_2O_3$ | $TiO_2$ |
| 3 | 0 | 2 cc/min $H_2S$ | $Cl_2$ | 59.4 | 66.7 | 95.6 | 61.7 |
| 4 | 5% S° | 2 cc/min $H_2S$ | $Cl_2$ | 91.2 | 94.2 | 100 | 95.6 |

As seen from the above examples, the addition of a sulfur containing compound as a catalyst during the calcination process dramatically increases the conversion of the metals to their corresponding chlorides. This is accomplished with the addition of a small amount of sulfur, approximately 5%, as see in the above chart.

Step 3—Chlorination

In the chlorination step 300, the ore, catalyst and reductant are combined with a chlorinating agent such as dry chlorine gas and/or a functionally equivalent chlorine compound (hereinafter collectively referred to as chlorine). As described above, a properly conditioned ore and carbon source as prepared in drying step 100 and calcination step 200 are important to ensure maximal results during chlorination step 300. As seen in the block diagram, the chlorinator receives calcined ore from stream 240, the dried carbon source from stream 130, the sulfur containing catalyst from stream 340 and chlorine from stream 310. All of the ingredients are fed into the chlorinator where a fluidized bed reactor operates between 500° C. and 1000° C. and preferably between 850° C. and 950° C. The chlorinator usually operates at atmospheric pressure. The dried carbon source is used as the reductant in the carbo-chlorination reaction. Tests have indicated that the sulfur containing catalyst dramatically increases both reaction rates and yield.

Any non-reactive residue collected in the chlorinator is removed via stream 320 and may be sold or used for mine fill. The gaseous metal chlorides obtained from the chlorination step are fed to the solids condensation step 400. The following examples indicate the increases in yield which may be obtained by including a sulfur containing compound as a catalyst.

EXAMPLE 5

Bauxite ore that contained 37.7% $Al_2O_3$, 30.2% $Fe_2O_3$, 7.0% $TiO_2$ and 5.5% $SiO_2$ was calcined to remove any chemically bound water and then mixed with 25% carbon. Two samples, one containing 1% elemental sulfur and one containing no sulfur, were reacted with chlorine at a temperature of 800° C. for 15 minutes. The sample containting sulfur resulted in chlorination of 74.6% $Al_2O_3$, 95.2% $Fe_2O_3$, 72.9% $TiO_2$, and 70.5% $SiO_2$. The sample without sulfur resulted in chlorination of 23.9% $Al_2O_3$, 88.6% $Fe_2O_3$, 75.5% $TiO_2$, and essentially no $SiO_2$. These results demonstrate that the presence of sulfur dramatically increased the chlorination rate of $Al_2O_3$ by 212%, of $Fe_2O_3$ by 7%, none for $TiO_2$, and for $SiO_2$ a factor of 70.5% versus zero under the experimental conditions.

EXAMPLES 6 AND 7

Kaolinitic clay was dried by heating to a temperature of 140° C. and then ground to −200 mesh. The ground clay was then mixed with powdered carbon and, in Example 7, also mixed with 5% elemental sulfur by weight. The mixture was bound together with a 2% starch binder and then again crushed to −200 mesh. The reactant mass was then calcined by heating to a temperature of 700° C. for 35 minutes under a flow of argon. After calcination, the temperature was increased to 800° C. and the flow or argon was replaced with a flow of chlorine. In Example 7, sulfur in the form of $H_2S$ was introduced along with the chlorine. Chlorination continued for 25 minutes, and then the reaction mixture was cooled and analyzed.

| EXAMPLE | ADDED DURING CALCINATION | CHLORINATION | TYPE | % WEIGHT CONVERSION $Al_2O_3$ | $SiO_2$ | $Fe_2O_3$ | $TiO_2$ |
|---|---|---|---|---|---|---|---|
| 6 | 0 | 0 | $Cl_2$ | 39.6 | 10.2 | 97.0 | 78.4 |
| 7 | 5% S° | 2 cc/min $H_2S$ | $Cl_2$ | 91.2 | 94.2 | 100 | 95.6 |

Step 4—Solids Condensation

Solids condensation system 400 receives the hot vapors produced in chlorination step 300 through stream 330 for the desublimation or condensation of aluminum chloride vapors into a solid product. Solids condensation system 400 is generally comprised of a heat exchanger which is well known and aluminum chloride condenser. Upon entry of the vapors into the system, the vapors are first cooled to between approximately 250° C. and 300° C. in the heat exchanger for the recovery of heat. These vapors are then directed into the aluminum chloride condensor which operates at a temperature below 180° C. The $AlCl_3$ and any $FeCl_3$ which is present, desublimates or solidifies in the condenser due to the lowered temperature. The condensation may be accomplished in conventional heat exchange equipment but the preferred equipment is that of a chain wipe condenser or a cooling fliud bed. The final gas temperature is between approximately 50° C. and 80° C. where the vapor pressure of $AlCl_3$ is between 0.004 mm Hg and 0.5 mm Hg. Thus the final temperature permits $AlCl_3$ condensation efficiencies of over 99.99%.

The collected solids of $AlCl_3$ and $FeCl_3$ are then conveyed via stream 410 to the $AlCl_3$ purification system and specifically to blender 412. The remaining vapors are transported via stream 420 to liquids condensation system 500.

Step 5—Liquids Condensation

The vapors collected from solids condensation unit 400 are directed into liquids condensation unit 500 through stream 420 where they first enter a condenser which uses refrigeration to maintain an operating temperature between 10° C. and −40° C. with the perferred condenser temperature of being approximately −40° C. This results in a partial pressure of $SiCl_4$ of approximately 8 mm Hg and $TiCl_4$ of approximately 0.2 mm Hg. Thus, at −40° C., approximately 98% of the $SiCl_4$ and 98% of the $TiCl_4$ are caused to condense into the liquid state. The remaining gases which are not condensed are directed through stream 520 to pollution control system 700 for scrubbing and then vented to atmosphere via line 710. The liquid mixture of $SiCl_4$/$TiCl_4$ is then directed to $SiCl_4$ purification system 600, via stream 510.

Step 6—$SiCl_4$ and $TiCl_4$ Purification

The crude liquid mixture of $SiCl_4$ and $TiCl_4$ is directed via stream 510 into $SiCl_4$ purification system 600 where they ae readily separated by the use of conventional rectification and condensation equipment. The equipment is operated at atmospheric pressure with a bottom temperature of approximately 136° C. and an overhead temperature of approximately 57° C. A reduction of equipment size and cost may be accomplished by carrying on rectification at higher pressures and correspondingly higher temperatures. The products are collected through separate streams with the $SiCl_4$ collected via stream 610 and the $TiCl_4$ being collected via stream 620 as illustrated.

Step 7—$AlCl_3$ Purification

Turning now to FIG. 2, the crude solid $AlCl_3$/$FeCl_3$ via stream 410 is fed into a blending tank 412 which is a tank relatively well known in the art for blending various materials that are injected thereinto. In the particular process there is injected a principal stream 410 of aluminum chloride in its crude state, i.e., crude aluminum chloride with approximately 5% of other metalic chloride impurities. Also, injected into the blender 412 is a stream 416 of preferably elemental sulfur and/or functionally equivalent sulfur containing compounds. It should be noted that if the crude aluminum chloride being injected contains a sufficient quantity of sulfur to effect the yield, then the sulfur need not be added. As further seen in FIG. 2, there is also injected simultaneously with the sulfur stream and the crude aluminum chloride stream 418, a stream of preferably powdered aluminum metal and/or functionally equivalent aluminum containing compound via stream 418. The injected streams 410, 416, and 418 into blender 412 are blended at a temperature of approximately 100° C. This blending of the crude aluminum chloride mixture at this temperature does not effect any chemical reactions, but would allow the lighter metal chlorides, i.e., titanium chloride, silcon chloride, hydrogen chloride, and $CoCl_2$ to be evaporated all of via stream 420 and collected and purified under liquid condensation step 500 as explained earlier.

At this point in the process, the mechanism by which sulfur acts as a reaction promoter and to increase the rate of yield of pure aluminum chloride has not yet been fully established. However, while not wishing to be bound by theory, it is believed that the active reaction promoter or catalyst is elemental sulfur. The term "reaction promoter" comprises one of the apparent functions of the sulfur and/or functional equivalent sulfur compounds as a catalytic agent relative to improvement in reaction rates achieved in the present invention and also commonly results in a higher yield value. However, the use of sulfur as a reaction promoter in the purification step of purification of aluminum chloride is a novel use of sulfur, and is thus, one of the prime bases of this particular inventive process.

Following the blending of aluminum chloride, sulfur and aluminum powder in blender 412, and the evaporating of the lighter chlorides, the aluminum chloride stream is then moved via line 422 into preferably a first latterally deposed screw-type sublimer 424. This type of screw-type sublimer 424 is relatively well known in the art, and therefore, its functioning component shall not be detailed. It is necessary in the particular process, that the container portion of sublimer 424 be maintained at a temperature of not less than 180° C. and at an atmosphere pressure not under one atmosphere with the blend being under constant agitation. Under these conditions, aluminum chloride, which has be acted upon by the sulfur in aluminum powder, sublimes in a substantially pure form from first sublimer 424 having in the range of 0.1% $FeCl_3$ chloride impurities.

This stream of substantially pure aluminum chloride flows from sublimer 424 via line 426 into a condenser 428 which is maintained at a temperature below 180° so that the sublimed aluminum chloride desublimes in condenser 428. Any residue which may remain in sublimer 424 during the sublimation process will be withdrawn from sublimer 424 via stream 430 and due to its high impurity shall be discarded as waste at 432. Returning now to condenser 428, desublimed substantially pure aluminum chloride will exit condenser 428 at stream 434 and enter a second sublimer 438. Like sublimer 424, second sublimer 428 again is maintained at a temperature of approximately 180° C. at one atmosphere pressure, so that the aluminum chloride again in the condensed form shall again undergo sublimation. Upon sublimation, gaseous aluminum chloride shall exit sublimer 438 via stream 440, at this point being classified as pure aluminum chloride, i.e., less than 0.05% ferric chloride impurities, and enter second condenser 442 which is similar to first condenser 428. Likewise, any residue remaining in sublimer 428 shall be extrated via stream 444, however, not having impurities of greater than 0.1% ferric chloride, will not be discarded as waste, but shall enter stream 446 and be returned to blender 412 for reuse in the process.

The pure stream of aluminum chloride which has entered condenser 442 will again be desublimed and will exit condenser 442 via stream 448 and into third sublimer 452 to again undergo sublimation at 180° C. and at one atmosphere pressure. Third sublimer 452, in view of the fact that it is receiving "pure" aluminum chloride, i.e., less than 0.05% impurities of ferric chloride, shall again be sublimed and exit via stream 454 in gaseous form to enter guard filter 456 which would comprise substantially solid aluminum granules or activated granular aluminum metal which would sufficient to remove any sulfur impurities and other metal chloride traces contained in this pure stream of aluminum chloride which has undergone multipe stage sublimation. Also, any residue shall be recycled via line 453 to join the $AlCl_3$ product in line 446 to be reintroduced into first sublimer 424 at point 425 or blender 412 at point 413. Likewise, guard filter 456 will constantly be fed with a fresh stream 458 of aluminum metal for maintaining guard filter 456 in its purest form. Residue from guard filter 456 will be extracted via line 463 to be recycled into the process at point 465 and introduced into blending tank 412.

As with first sublimer 424 and second sublimer 438, third sublimer 452 likewise will have a residue, with this residue being "pure" aluminum chloride with 0.05% FeCl, and will be extracted via stream 460 for collection at point 462. This pure aluminum chloride collected from stream 460 can either be recycled via line 446 or can be sold as commercially pure aluminum chloride.

Returning now to the sublimed aluminum chloride which is being passed through guard filter 456, the sublimed aluminum chloride that exits guard filter 456 via stream 464, and is moved into final condenser 466 wherein it condenses at a temperature below 180° F. and one atmosphere pressure, is considered "very pure" (i.e. 99.99% pure) aluminum chloride, i.e., having less than 0.01% iron chloride impurities. This purity of aluminum chloride is by far the purest aluminum chloride which is obtainable and is a very desirable producted in the industry. It could, of course, be sold and utilized in its puriest form.

In addition to the sublimation steps in the purification of the aluminum chloride, following the exiting of the aluminum chloride stream via line 454 out of sublimer 452, rather than entering guard filter 456, there could be provided the optional step of circulating the aluminum chloride stream into rectification column 480 via line 478, which column operates at a pressure to exceed 2.5 atmospheres, preferably 3 to 4 atmospheres of pressure, and at a temperature range above 190° C. preferably at about 225° C. It is at this temperature and pressure that the separation of aluminum chloride and ferric chloride is achieved. A portion of the aluminum chloride in the vapor state evolved overhead via stream 482 would exit in rectification column 480 and is in substantially pure form (i.e. 99.99% pure $AlCl_3$), i.e., containing less than 0.01% ferric chloride impurities. The pure aluminum chloride in column 480 after going through reflux, could then enter guard filter 456 via line 484 or be routed directly to condenser 466 via line 482, as seen in FIG. 2.

As was stated earlier, the significant aspects of the present process is the overall combination of the addition of elemental sulfur and/or functionally equivalent sulfur containing compounds being added to a stream of crude aluminum chloride as a process enhancer or a yield enhancer in the purification of crude aluminum chloride, i.e., other than as a major reducing agent or reactor. That, taken in combination with multi-stage sublimation process, enables one to obtain the puriest form of aluminum chloride available on the market, at this time, and still achieve higher rates and yield of the product. It is significant that in the overall process the temperature in the process does not exceed for the most part 180° C. and the pressures should not exceed one atmosphere pressure. This multi-stage sublimation process in obtaining very pure aluminum chloride is a significant breakthrough in the overall purification process, and will be of significant value in providing the aluminum industry with pure aluminum chloride and a relatively low cost of the process.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limited sense.

What is claimed as invention is:

1. A process for producing and yielding metal chlorides, comprising the steps of:
    a. providing aluminous ore and a carbon source;
    b. drying and calcining said aluminum ore and carbon source at a temperature not to exceed 900° C. in the presence of a sulfur containing compound;
    c. combining said aluminous ore and carbon source with a chlorinating agent at a temperature range from 500° C. to 1000° C. thereby producing crude metal chlorides;
    d. condensing solid crude $AlCl_3$ and separating it from crude $SiCl_4$ and $TiCl_4$ formed in said step 1c.;
    f. sublimating and desublimating said $AlCl_3$ to produce substantially pure $AlCl_3$ at a temperature not to exceed 180° C. and one (1.0) atmosphere of pressure.

2. The process in claim 1, wherein said aluminous ore is kaolinitic, illitic, or other aluminum clays, bauxite clay or siliceous bauxites, or sillimanites.

3. The process of claim 1, wherein said carbon source is carbon monoxide or carbonyl chloride ($COCl_2$).

4. The process of claim 1, wherein in said drying step, said aluminous ore and carbon source are fed into a dryer at a temperature of about 300° C.

5. The process of claim 1, wherein in said calcination step, said sulfur containing compound is a compound having less than 5% by weight of elemental sulfur.

6. The process of claim 1, wherein said sulfur added to said crude $AlCl_3$ serves as the catalyst in the rate and yield of substantially pure $AlCl_3$.

7. The process of claim 1, wherein said sublimation of said crude $AlCl_3$ takes place at a temperature of approximately 180° C. and one (1.0) atmosphere of pressure.

8. The process of claim 1, further comprising the steps of sublimating and desublimating said $AlCl_3$ product until 99.99% or greater $AlCl_3$ is produced.

9. A process for producing and yielding metal chlorides with a purity greater than 99.99%, comprising the steps of:
    a. providing aluminous ore and a carbon source;
    b. drying and calcining said aluminum ore and carbon source at a temperature not to exceed 900° C. in the presence of a sulfur containing compound;
    c. combining said aluminus ore and carbon source with a chlorinating agent at a temperature range from 500° C. to 1000° C. to produce crude metal chlorides;
    d. condensing solid crude $AlCl_3$ and separating it from crude $SiCl_4$ and $TiCl_4$ formed in said step 9c.;
    e. combining said solid $AlCl_3$ with sulfur and aluminum powder;
    f. sublimating and desublimating said $AlCl_3$ to produce substantially pure $AlCl_3$ at a temperature not to exceed 180° C. and one atmosphere of pressure;
    g. condensing said substantially pure $AlCl_3$ and heating said condensed $AlCl_3$ to a temperature exceeding 190° C. at 2.5 atmospheres of pressure;
    h. flowing said $AlCl_3$ in the molten stage to a first rectification column at a temperature in excess of 190° C. and 2.5 atmospheres of pressure;
    i. collecting pure $AlCl_3$ having impurities of less than 0.02% from said rectification column; and
    j. flowing said pure $AlCl_3$ to a second rectification column for producing $AlCl_3$ having a purity equal to or greater than 99.99%.

* * * * *